United States Patent
Tian et al.

(10) Patent No.: US 11,262,871 B2
(45) Date of Patent: Mar. 1, 2022

(54) TOUCH CONTROL DISPLAY PANEL, DRIVING METHOD THEREOF AND TOUCH CONTROL DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Zhenguo Tian, Beijing (CN); Shuai Chen, Beijing (CN); Shuang Hu, Beijing (CN); Xiuzhu Tang, Beijing (CN); Hailong Wu, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/044,144

(22) PCT Filed: Jan. 3, 2020

(86) PCT No.: PCT/CN2020/070202
§ 371 (c)(1),
(2) Date: Sep. 30, 2020

(87) PCT Pub. No.: WO2020/140962
PCT Pub. Date: Jul. 9, 2020

(65) Prior Publication Data
US 2021/0026515 A1   Jan. 28, 2021

(30) Foreign Application Priority Data
Jan. 4, 2019   (CN) .......................... 201910008977.0

(51) Int. Cl.
*G06F 3/041* (2006.01)
*G09G 3/36* (2006.01)

(52) U.S. Cl.
CPC ........ *G06F 3/04184* (2019.05); *G06F 3/0412* (2013.01); *G09G 3/3674* (2013.01); *G09G 2310/0202* (2013.01); *G09G 2310/08* (2013.01)

(58) Field of Classification Search
CPC .. G06F 3/0412; G06F 3/0416; G06F 3/04166; G06F 3/04184; G09G 3/36; G09G 3/3674; G09G 2310/0202; G09G 2310/08
See application file for complete search history.

(56) References Cited

U.S. PATENT DOCUMENTS

| | | | |
|---|---|---|---|
| 7,639,226 B2 * | 12/2009 | Kim | G11C 19/28 345/100 |
| 9,665,227 B2 * | 5/2017 | Ding | G06F 3/0446 |

(Continued)

FOREIGN PATENT DOCUMENTS

| | | |
|---|---|---|
| CN | 102402330 A | 4/2012 |
| CN | 103927048 A | 7/2014 |

(Continued)

OTHER PUBLICATIONS

China Patent Office, First Office Action dated Jan. 17, 2020 issued in corresponding Chinese Application No. 201910008977.0.

(Continued)

*Primary Examiner* — Joe H Cheng
(74) *Attorney, Agent, or Firm* — Houtteman Law LLC

(57) ABSTRACT

The present disclosure provides a touch control display panel, a driving method thereof and a touch control display device. The touch control display panel includes a plurality of gate lines on a base substrate, a plurality of touch control lines above the plurality of gate lines and opposite to the (Continued)

plurality of gate lines, and a driving circuit, wherein the plurality of gate lines and the plurality of touch control lines extend along a same direction, and the driving circuit includes a timing controller, a control unit and a touch control driving unit. The timing controller is configured to output a gate driving signal to the control unit. The control unit is configured to generate touch control synchronization signal(s) according to the gate driving signal and output the touch control synchronization signal(s) to the touch control driving unit.

18 Claims, 6 Drawing Sheets

(56) References Cited

U.S. PATENT DOCUMENTS

| | | | | |
|---|---|---|---|---|
| 9,837,033 | B2* | 12/2017 | Katsuta | G06F 3/0418 |
| 2012/0056835 | A1* | 3/2012 | Choo | G09G 3/3677 |
| | | | | 345/173 |
| 2012/0256861 | A1* | 10/2012 | Park | G06F 3/0412 |
| | | | | 345/173 |
| 2013/0009888 | A1 | 1/2013 | Park | |
| 2013/0300681 | A1* | 11/2013 | Jamshidi-Roudbari | |
| | | | | G06F 3/044 |
| | | | | 345/173 |
| 2016/0224175 | A1* | 8/2016 | Moon | G09G 3/20 |
| 2016/0299618 | A1* | 10/2016 | Liu | G02F 1/13338 |
| 2017/0090624 | A1* | 3/2017 | Kwon | G06F 1/3296 |
| 2019/0079631 | A1* | 3/2019 | Kim | G06F 3/0416 |
| 2019/0279600 | A1* | 9/2019 | Chan | G06F 3/0412 |

FOREIGN PATENT DOCUMENTS

| | | |
|---|---|---|
| CN | 203812226 U | 9/2014 |
| CN | 104123039 A | 10/2014 |
| CN | 104317446 A | 1/2015 |
| CN | 104991689 A | 10/2015 |
| CN | 108255342 A | 7/2018 |
| CN | 109669583 A | 4/2019 |

OTHER PUBLICATIONS

China Patent Office, Second Office Action dated Jul. 20, 2020 issued in corresponding Chinese Application No. 201910008977.0.
China Patent Office, Decision of Rejection dated Nov. 11, 2020 issued in corresponding Chinese Application No. 201910008977.0.

* cited by examiner

FIG. 6

TOUCH CONTROL DISPLAY PANEL, DRIVING METHOD THEREOF AND TOUCH CONTROL DISPLAY DEVICE

CROSS REFERENCE TO RELATED APPLICATIONS

The application is a national stage of PCT/CN2020/070202, filed on Jan. 3, 2020, which claims the priority of the Chinese Patent Application No. 201910008977.0, filed on Jan. 4, 2019, the content of which is incorporated herein by reference in its entirety.

TECHNICAL FIELD

The present disclosure relates to the field of display technology, in particular to a touch control display panel, a driving method thereof and a touch control display device.

BACKGROUND

Compared with a traditional One Glass Solution (OGS), in a Single Layer On Cell (SLOC) touch control display panel, a touch control sensor layer is directly manufactured on a Color Filter (CF) substrate, so that a display device becomes lighter and thinner.

SUMMARY

The present disclosure provides a touch control display panel, a driving method thereof and a touch control display device.

In one embodiment, the touch control display panel includes a plurality of gate lines arranged on a base substrate, a plurality of touch control lines arranged above the plurality of gate lines and disposed opposite to the plurality of gate lines, and a driving circuit, where the plurality of gate lines and the plurality of touch control lines extend in a same direction, and the driving circuit includes: a timing controller, a control unit and a touch control driving unit; the timing controller is configured to output a gate driving signal to the control unit; the control unit is configured to generate at least one touch control synchronization signal according to the gate driving signal and output the at least one touch control synchronization signal to the touch control driving unit; the touch control driving unit is configured to perform a scanning control on the plurality of touch control lines according to the at least one touch control synchronization signal during one frame displaying, so that a gate control signal applied to a gate line correspondingly arranged to any touch control line being scanned is in an invalid state during the frame displaying.

In one embodiment, the driving circuit performs a display control on the plurality of gate lines in a line-by-line scanning manner, and performs a touch control on the plurality of touch control lines in a line-by-line scanning manner, and the touch control driving unit performs the scanning control on the plurality of touch control lines to determine, according to the at least one touch control synchronization signal, from which one of the plurality of touch control lines to start to scan the plurality of touch control lines when the driving circuit starts to scan the plurality of gate lines in the line-by-line scanning manner, so that any touch control line and a gate line correspondingly arranged to the touch control line are not in a scanned state at the same time.

In one embodiment, the at least one touch control synchronization signal includes a plurality of touch control synchronization signals respectively provided for the plurality of touch control lines, where the plurality of touch control synchronization signals includes a scanning sequence and a scanning time duration for each touch control line.

In one embodiment, a report rate of the touch control driving unit is greater than a scanning frequency for the gate lines of the touch control display panel; and the touch control driving unit is configured to scan the plurality of touch control lines of the touch control display panel multiple times according to the at least one touch control synchronization signal during one frame displaying.

In one embodiment, the report rate of the touch control driving unit is 2 times of the scanning frequency for the gate lines of the touch control display panel; and the touch control driving unit is configured to scan the plurality of touch control lines of the touch control display panel twice according to the at least one touch control synchronization signal during one frame displaying, and the two scanning includes a first scanning and a second scanning.

In one embodiment, the number of the plurality of gate lines is V, a refresh frequency of the touch control display panel is F, the report rate of the touch control driving unit is M, and the number of the plurality of touch control lines is B, thus the number of the scanned gate lines corresponding to the scanning time duration for each touch control line is: (F/M)*(V/B), where the number of the scanned gate lines corresponding to a physical position of each touch control line is V/B; the plurality of gate lines are started to be scanned from a first gate line in the line-by-line scanning manner, an initial position for scanning the touch control lines in the first scanning is set to be X1, an initial position for scanning the touch control lines in the second scanning is set to be X2, the number of scanned touch control lines is Y, the maximum value of the number Y of the scanned touch control lines during one frame displaying is B*M/F, and an interval between a gate line being scanned and a touch control line being scanned is at least an interval of 5 touch control lines during one frame displaying, the control unit includes a processor configured to sequentially execute the following equations (1) to (4) to obtain X1 and X2:

$$\begin{cases} 1 \leq Y \leq B \\ X1 + Y - 1 \leq B \\ |VX1/B - F/M^*V/B^*Y| > 5^*V/B \\ Y = Y + 1 \\ X1 = X1 + Y \end{cases} \quad (1)$$

$$\begin{cases} 1 \leq Y \leq B \\ X1 + Y - 1 > B \\ |VX1/B - F/M^*V/B^*Y| > 5^*V/B \\ Y = Y + 1 \\ X1 = X1 + Y - B \end{cases} \quad (2)$$

$$\begin{cases} B < Y < BM/F \\ X2 + Y - B - 1 \leq B \\ |VX2/B - F/M^*V/B^*Y| > 5^*V/B \\ Y = Y + 1 \\ X2 = X2 + Y - B \end{cases} \quad (3)$$

-continued $$\begin{cases} B < Y < BM/F \\ X2 + Y - B - 1 > B \\ |VX2/B - F/M^*V/B > 5^*V/B \\ Y = Y + 1 \\ X2 = X2 + Y - BM/F \end{cases} \quad (4)$$

where ranges of X1 and X2 are obtained by substituting X1 and X2 with all values from 1 to B.

In one embodiment, the refresh frequency of the touch control display panel is 60 Hz, the report rate is 120 Hz, the plurality of gate lines include 1080 gate lines, the plurality of touch control lines include 25 touch control lines, and |2*X1−Y|>10, for each X1, Y (which is an integer) is taken 25 times in a range of 1 to 25 in sequence, respectively, so as to obtain X1=7, X2=19, and X1=8, X2=20.

In one embodiment, the gate driving signal includes a start vertical signal and a clock signal, the control unit further includes a counter configured to perform a zero clearing process on a count result according to the start vertical signal, count the count result according to the clock signal and output the count result to the processor; and the processor is further configured to generate the at least one touch control synchronization signal according to the count result and the initial position X1 for scanning the touch control lines in the first scanning and the initial position X2 for scanning the touch control lines in the second scanning, and output the at least one touch control synchronization signal to the touch control driving unit.

In one embodiment, the touch control display panel further includes a gate driving unit, where the timing controller is configured to output a gate driving signal to the gate driving unit, and the gate driving unit is configured to generate a gate control signal according to the gate driving signal, and output the gate control signal to the plurality of gate lines.

The disclosure further provides a touch control display device including the touch control display panel.

The present disclosure also provides a method for driving a touch control display panel, where the touch control display panel includes a plurality of gate lines arranged on a base substrate, a plurality of touch control lines arranged above the plurality of gate lines and disposed opposite to the plurality of gate lines, and a driving circuit, where the plurality of gate lines and the plurality of touch control lines extend in a same direction, and the driving circuit includes: a timing controller, a control unit and a touch control driving unit, the method includes steps of: outputting, by the timing controller, a gate driving signal to the control unit; generating, by the control unit, at least one touch control synchronization signal according to the gate driving signal and outputting the at least one touch control synchronization signal to the touch control driving unit; and performing, by the touch control driving unit, a scanning control on the plurality of touch control lines of the touch control display panel according to the at least one touch control synchronization signal during one frame displaying, so that a gate control signal applied to a gate line correspondingly arranged to any touch control line being scanned is in an invalid state during the frame displaying.

In one embodiment, the driving circuit performs a display control on the plurality of gate lines in a line-by-line scanning manner, and performs a touch control on the plurality of touch control lines in a line-by-line scanning manner, and the touch control driving unit performs the scanning control on the plurality of touch control lines to determine, according to the at least one touch control synchronization signal, from which one of the plurality of touch control lines to start to scan the plurality of touch control lines when the driving circuit starts to scan the plurality of gate lines in the line-by-line scanning manner, so that any touch control line and a gate line correspondingly arranged to the touch control line are not in a scanned state at the same time.

In one embodiment, the at least one touch control synchronization signal includes a plurality of touch control synchronization signals respectively provided for the plurality of touch control lines, where the plurality of touch control synchronization signals includes a scanning sequence and a scanning time duration for each touch control line.

In one embodiment, a report rate of the touch control driving unit is greater than a scanning frequency for the gate lines of the touch control display panel; and the step of performing, by the touch control driving unit, a scanning control on the plurality of touch control lines of the touch control display panel according to the at least one touch control synchronization signal during one frame displaying includes steps of: scanning, by the touch control driving unit, the plurality of touch control lines of the touch control display panel multiple times according to the at least one touch control synchronization signal during one frame displaying.

In one embodiment, the report rate of the touch control driving unit is 2 times of the scanning frequency for the gate lines of the touch control display panel; and the step of performing, by the touch control driving unit, a scanning control on the plurality of touch control lines of the touch control display panel according to the at least one touch control synchronization signal during one frame displaying includes steps of: scanning, by the touch control driving unit, the plurality of touch control lines of the touch control display panel twice according to the at least one touch control synchronization signal during one frame displaying, and the two scanning includes a first scanning and a second scanning.

In one embodiment, the number of the plurality of gate lines is V, a refresh frequency of the touch control display panel is F, the report rate of the touch control driving unit is M, and the number of the plurality of touch control lines is B, thus the number of the scanned gate lines corresponding to the scanning time duration for each touch control line is: (F/M)*(V/B), where the number of the scanned gate lines corresponding to a physical position of each touch control line is V/B; the plurality of gate lines are started to be scanned from a first gate line in the line-by-line scanning manner, an initial position for scanning the touch control lines in the first scanning is set to be X1, an initial position for scanning the touch control lines in the second scanning is set to be X2, the number of scanned touch control lines is Y, the maximum value of the number Y of the scanned touch control lines during one frame displaying is B*M/F, and an interval between a gate line being scanned and a touch control line being scanned is at least an interval of 5 touch control lines during one frame displaying, the control unit includes a processor configured to sequentially execute the following equations (1) to (4) to obtain X1 and X2:

$$\begin{cases} 1 \le Y \le B \\ X1+Y-1 \le B \\ |VX1/B - F/M^*V/B^*Y| > 5^*V/B \\ Y = Y+1 \\ X1 = X1+Y \end{cases} \quad (1)$$

$$\begin{cases} 1 \le Y \le B \\ X1+Y-1 > B \\ |VX1/B - F/M^*V/B^*Y| > 5^*V/B \\ Y = Y+1 \\ X1 = X1+Y-B \end{cases} \quad (2)$$

$$\begin{cases} B < Y < BM/F \\ X2+Y-B-1 \le B \\ |VX2/B - F/M^*V/B^*Y| > 5^*V/B \\ Y = Y+1 \\ X2 = X2+Y-B \end{cases} \quad (3)$$

$$\begin{cases} B < Y < BM/F \\ X2+Y-B-1 > B \\ |VX2/B - F/M^*V/B > 5^*V/B \\ Y = Y+1 \\ X2 = X2+Y-BM/F \end{cases} \quad (4)$$

where ranges of X1 and X2 are obtained by substituting X1 and X2 with all values from 1 to B.

In one embodiment, the refresh frequency of the touch control display panel is 60 Hz, the report rate is 120 Hz, the plurality of gate lines include 1080 gate lines, the plurality of touch control lines include 25 touch control lines, and |2*X1-Y|>10, for each X1, Y (which is an integer) is taken 25 times in a range of 1 to 25 in sequence, respectively, so as to obtain X1=7, X2=19, and X1=8, X2=20.

In one embodiment, the gate driving signal includes a start vertical signal and a clock signal, and the control unit further includes a counter; the method further includes steps of: performing, by the counter, a zero clearing process on a count result according to the start vertical signal, counting the count result according to the clock signal and outputting the count result to the processor; and generating, by the processor, the at least one touch control synchronization signal according to the count result and the initial position X1 for scanning the touch control lines in the first scanning and the initial position X2 for scanning the touch control lines in the second scanning, and outputting the at least one touch control synchronization signal to the touch control driving unit.

BRIEF DESCRIPTION OF DRAWINGS

FIG. 6 is a diagram illustrating scanning information of a driving circuit of a touch control display panel according to an embodiment of the present disclosure.

DETAIL DESCRIPTION OF EMBODIMENTS

In order to make one of ordinary skill in the art better understand technical solutions of the present disclosure, a touch control display panel, a driving method thereof and a touch control display device in the present disclosure are described in detail below with reference to the drawings.

In the related art, in a Single Layer On Cell (SLOC) touch control display panel, a touch control sensor layer is directly manufactured on a Color Filter (CF), so that a capacitance of a capacitor Cgs between a touch control line in the touch control sensor layer and a corresponding gate line is relatively large. For example, each touch control line includes a plurality of Sensor Patterns, a gate control signal has a high amplitude, and the gate control signal may be coupled to the Sensor Patterns through the capacitor Cgs, so that a signal-to-noise ratio of a touch control scanning signal is reduced, thereby causing a Touch Noise issue.

Figure 1:
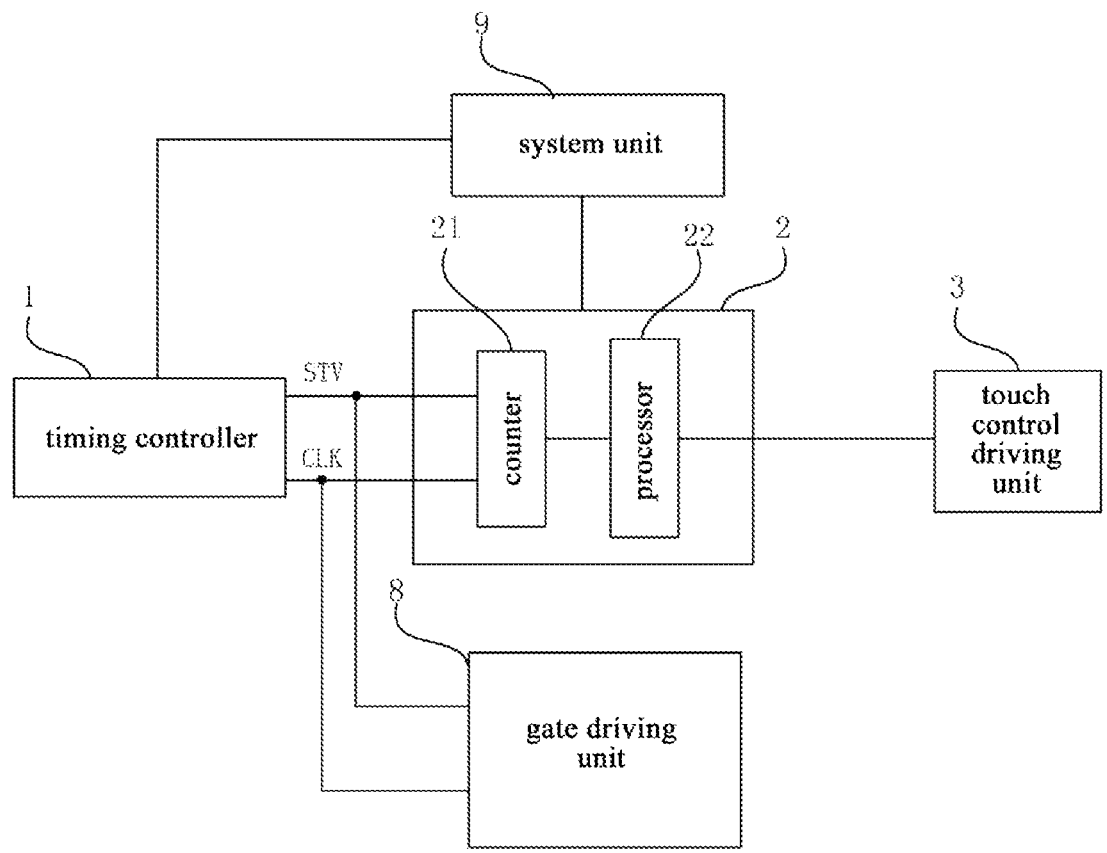
FIG. 1 is a schematic structural diagram of a driving circuit of a touch control display panel according to an embodiment of the present disclosure.

FIG. 1 is a schematic structural diagram of a driving circuit of a touch control display panel according to an embodiment of the present disclosure. As shown in FIG. 1, the driving circuit includes: a timing controller 1, a control unit 2 and a touch control driving unit 3. The timing controller 1 is configured to output a gate driving signal to the control unit 2; the control unit 2 is configured to generate at least one touch control synchronization signal according to the gate driving signal and output the at least one touch control synchronization signal to the touch control driving unit 3; and the touch control driving unit 3 is configured to perform a scanning control on touch control lines of the touch control display panel according to the at least one touch control synchronization signal during one frame displaying, so that a gate control signal applied to a gate line correspondingly arranged to any touch control line being scanned is in an invalid state during the frame displaying.

In this embodiment, the control unit 2 may be a microcontroller unit (MCU); the touch control driving unit 3 may be a Touch IC. For example, the microcontroller unit MCU may process position information obtained on the Touch IC into corresponding actions and transmit the actions to an upper computer. In the present application, a counter 21, as shown in FIG. 1, may be integrated on a conventional microcontroller unit for detecting touch so as to synchronize scanning for gate lines on an array substrate and scanning for touch control lines in the touch control sensor layer, so as to ensure that a touch control line and a gate line correspondingly arranged to the touch control line are not in a high level state at the same time when the gate lines and the touch control lines are scanned. That is, a scanning signal applied to the touch control line and a scanning signal applied to the gate line correspondingly arranged to the touch control line are not in a valid state at the same time, so as to avoid a capacitive coupling between the gate line and the touch control line and generating a Touch Noise.

As shown in FIG. 1, the gate driving signal includes a Start Vertical (STV) signal and a Clock (CLK) signal, and the control unit 2 includes the counter 21 and a processor 22.

The counter 21 is configured to perform a zero clearing process on a count result according to the start vertical signal STV, count the count result according to the clock signal CLK and output the count result to the processor 22. The processor 22 is configured to generate the at least one touch control synchronization signal according to the count result and output the at least one touch control synchronization signal to the touch control driving unit 3, to determine a scanning sequence for the touch control lines.

In this embodiment, the control unit 2 includes 3 pins including a Reset terminal pin, a Trig terminal pin, and an Output terminal pin. The timing controller 1 outputs the start vertical signal to the counter 21 through the Reset terminal pin, and the timing controller 1 outputs the clock signal to the counter 21 through the Trig terminal pin. The processor 22 outputs the at least one touch control synchronization signal to the touch control driving unit 3 through the Output terminal pin.

In this embodiment, the counter 21 performs the zero clearing process on the count result when each rising edge of the start vertical signal comes, and starts counting from 0 again. The counter 21 performs an addition of 1 process on the count result when each rising edge of the clock signal comes and outputs the count result to the processor 22.

Figure 2A:
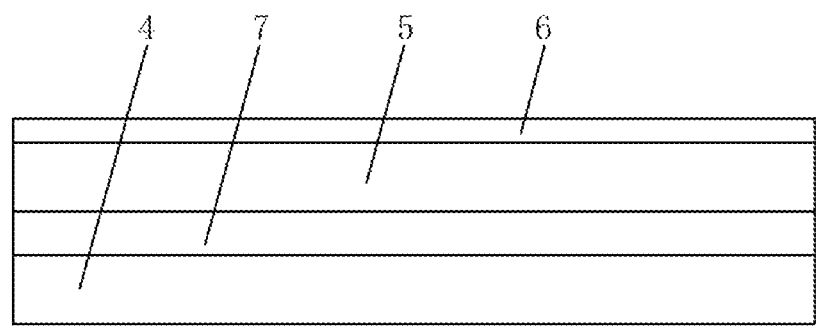
FIG. 2a is a schematic structural diagram of a touch control display panel according to an embodiment of the present disclosure.
Figures 2B, 3:
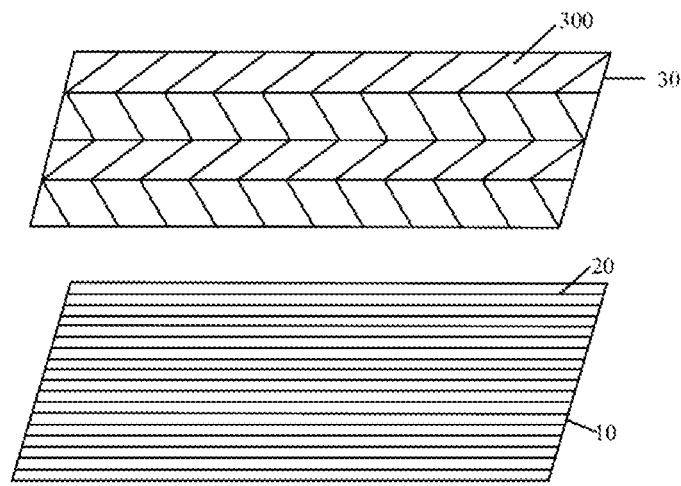
FIG. 2b is a schematic structural diagram of a touch control display panel according to an embodiment of the present disclosure.
FIG. 3 is a diagram illustrating a correspondence between gate lines and touch control lines in a touch control display panel according to an embodiment of the present disclosure.

In this embodiment, the driving circuit of the touch control display panel may be used for driving the touch control display panel. FIGS. 2a and 2b are schematic structural diagrams of a touch control display panel. As shown in FIGS. 2a and 2b, the touch control display panel includes an array substrate 4 and a color filter substrate 5 which are arranged oppositely, a touch control sensor layer 6 is arranged on a side of the color filter substrate 5 distal to the array substrate 4. A liquid crystal layer 7 is arranged between the array substrate 4 and the color filter substrate 5. The array substrate 4 includes a base substrate 10, and a plurality of gate lines 20 and a plurality of data lines on a side of the substrate 10 close to the color filter substrate 5. The plurality of gate lines and the plurality of data lines are arranged in a crossing manner, for example, if a resolution of the touch control display panel is H*V, the touch control display panel includes H data lines and V gate lines. The touch control sensor layer 6 includes a plurality of touch control lines 30, and each touch control line 30 includes a plurality of sensor patterns 300. In this embodiment, the touch control driving unit 3 scans the touch control lines in a line scanning manner. In this embodiment, for example, the touch control lines have a shape of fish bone. For example, as shown in FIG. 2b, the touch control display panel includes B touch control lines, and each touch control line includes A touch control blocks. In this embodiment, the touch control lines and the gate lines extend in a same direction, and as shown in FIG. 2b and FIG. 3, each touch control line may cover a fixed number of the gate lines. In this embodiment, the touch control display panel is an On Cell touch control display panel, and in such touch control display panel, the gate lines and the touch control lines may be scanned simultaneously in the line scanning, so that a coupling capacitance may be generated between a gate line being scanned and a touch control line being scanned, which affects an accuracy of a touch control detection signal.

FIG. 3 is a diagram illustrating a correspondence between gate lines and touch control lines in a touch control display panel according to an embodiment of the present disclosure. As shown in FIG. 3, the gate lines and the touch control lines are arranged correspondingly, and each touch control line is correspondingly arranged to at least one gate line. In this embodiment, each touch control line is correspondingly arranged to a plurality of gate lines. For example, taking a 15.6 inch Full High Definition (FHD) High Advanced Super Dimension Switch (HADS) SLOC touch control display panel currently produced in mass production as an example, the touch control display panel includes 1080 gate lines including gate line G1, gate line G2, . . . , and gate line G1080, and gate control signals GOUT1, GOUT2, . . . , and GOUT1080 are respectively applied to the 1080 gate lines. The touch control display panel includes 25 touch control lines including touch control line 1, touch control line 2, . . . , and touch control line 25 (the numbers shown in left-hand boxes in FIG. 3 indicate the numbers of touch control lines). Different touch control lines may correspond to a same number of the gate lines or different numbers of the gate lines. In this embodiment, different touch control lines correspond to different numbers of the gate lines. For example, the touch control line 1 corresponds to the gate lines G1-G43, the touch control line 2 corresponds to the gate lines G44-G85, the touch control line 3 corresponds to the gate lines G86-G129, . . . , and the touch control line 25 corresponds to the gate lines G1037-G1080. In this embodiment, the touch control lines and the gate lines are arranged correspondingly, which means that the touch control lines and the gate lines are arranged correspondingly in a spatial position. For example, as shown in FIGS. 2a to 2b and FIG. 3, the touch control lines are located right above the corresponding gate lines. In other words, an orthographic projection of a touch control line on the base substrate coincides with an orthographic projection of the corresponding gate lines on the base substrate.

In this embodiment, a report rate of the touch control driving unit 3 is greater than a scanning frequency for the gate lines of the touch control display panel. The touch control driving unit 3 is configured to scan the touch control lines of the touch control display panel multiple times according to the at least one touch control synchronization signal during one frame displaying.

In this embodiment, the report rate of the touch control driving unit 3 is 2 times of the scanning frequency for the gate lines of the touch control display panel. The touch control driving unit 3 is configured to scan the touch control lines of the touch control display panel twice according to the at least one touch control synchronization signal during one frame displaying.

In one embodiment, the driving circuit performs a display control on the gate lines in a line-by-line scanning manner, performs a touch control on the touch control lines in a line-by-line scanning manner, and the touch control driving unit performs the scanning control on the touch control lines to determine, according to the at least one touch control synchronization signal, from which one of the touch control line to start to scan when the driving circuit starts to scan the gate lines in the line-by-line scanning manner, so that any touch control line and a gate line correspondingly arranged to the touch control line are not in a scanned state at the same time.

That is, in this embodiment, the scanning control on the plurality of gate lines and the plurality of touch control lines are both performed in the line-by-line scanning manner, but the gate lines and the touch control lines arranged correspondingly to each other in a physical position are prevented from being scanning at the same time in this scanning manner. That is, the scanning signals applied to the gate lines and the touch control lines arranged correspondingly to each other in a physical position are prevented from being in a valid state at the same time, for example, being in a high level state at the same time. Because if a gate line and a touch control line arranged correspondingly to each other in a physical position are both in the high level state, a coupling capacitance is generated between the gate line and the touch control line, which affects an accuracy of a touch control detection signal on the touch control line.

In one embodiment, the touch control display panel includes V gate lines, a refresh frequency of the touch control display panel is F, the report rate of the touch control driving unit is M, and the number of the touch control lines is B, thus the number of the scanned gate lines corresponding to the scanning time duration for each touch control line is: (F/M)*(V/B), where the number of the scanned gate lines corresponding to a physical position of each touch control line is V/B; the plurality of gate lines are started to be scanned from a first gate line in the line-by-line scanning manner, an initial position for scanning the touch control lines in the first scanning is set to be X1, an initial position for scanning the touch control lines in the second scanning is set to be X2, the number of scanned touch control lines is Y, the maximum value of the number Y of the scanned touch control lines during one frame displaying is B*M/F, and an interval between a gate line being scanned and a touch control line being scanned is at least an interval of 5 touch control lines during one frame displaying, so as to effectively avoid the touch control signal noise caused by the capacitive coupling; the control unit includes a processor configured to sequentially execute the following equations (1) to (4) to obtain X1 and X2:

$$\begin{cases} 1 \leq Y \leq B \\ X1 + Y - 1 \leq B \\ |VX1/B - F/M*V/B*Y| > 5*V/B \\ Y = Y + 1 \\ X1 = X1 + Y \end{cases} \quad (1)$$

$$\begin{cases} 1 \leq Y \leq B \\ X1 + Y - 1 > B \\ |VX1/B - F/M*V/B*Y| > 5*V/B \\ Y = Y + 1 \\ X1 = X1 + Y - B \end{cases} \quad (2)$$

A range of X1 may be obtained by equations (1) and (2).

$$\begin{cases} B < Y < BM/F \\ X2 + Y - B - 1 \leq B \\ |VX2/B - F/M*V/B*Y| > 5*V/B \\ Y = Y + 1 \\ X2 = X2 + Y - B \end{cases} \quad (3)$$

$$\begin{cases} B < Y < BM/F \\ X2 + Y - B - 1 > B \\ |VX2/B - F/M*V/B > 5*V/B \\ Y = Y + 1 \\ X2 = X2 + Y - BM/F \end{cases} \quad (4)$$

The initial position for scanning may be obtained by substituting X1 and X2 with all values from 1 to B, thus obtaining ranges of X1 and X2.

Specifically, the above equations (1) to (4) may be implemented by employing the following program instruction:

```
for (X1=1; X1<B; X1=X1+1)
    for (Y=1; Y<B; Y=Y+1)
    {
        if (X1+Y<B+2)
            C=X1+Y
        else
            C=X1+Y−B
        if (|C−F/M*Y|>5)
            D=X1
    }
```

The result is calculated by this program instruction, and the range of X1 can be obtained from the value of D.

```
for (X2=1; X2<B; X2=X1+1)
    for (Y=B+1; Y<B*M/F; Y=Y+1)
    {
        if (X2+Y<2B+2)
            E=X2+Y−B
        else
            E=X2+Y−2B
        if (|E−F/M*Y|>5)
            G=X1
    }
```

The result is calculated by this program instruction, and the range of X2 can be obtained from the value of G.

Figure 5:
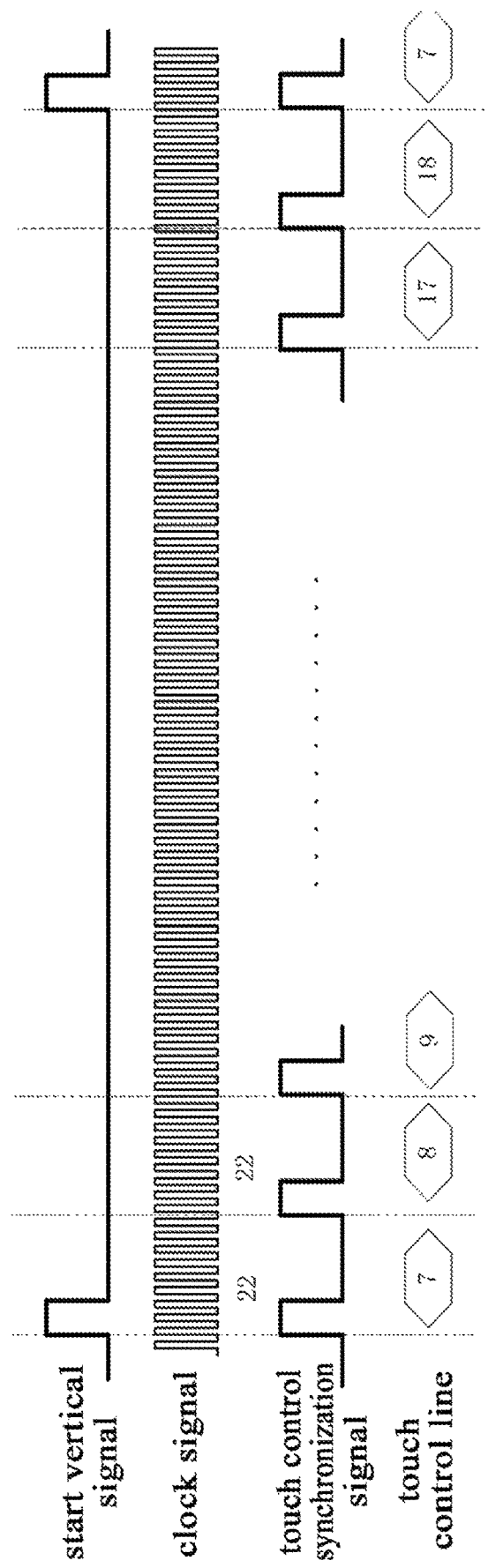
FIG. 5 is a waveform diagram of signals for driving a display panel according to an embodiment of the present disclosure.
Figure 6:
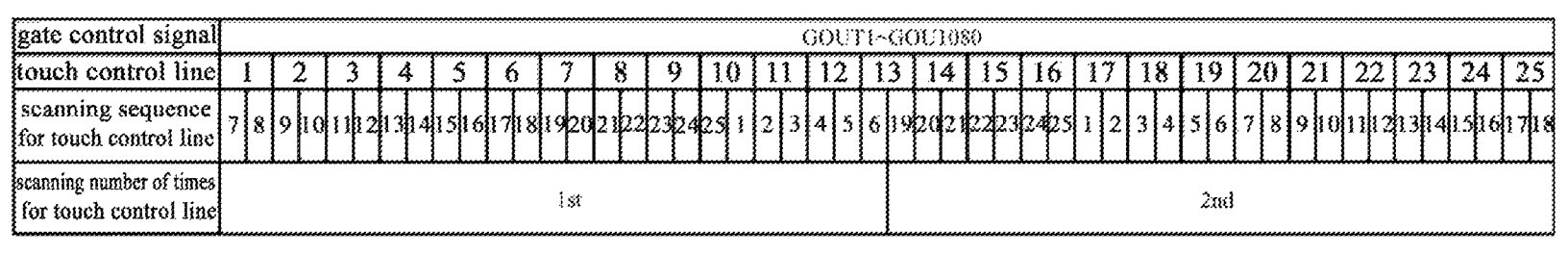

In the embodiment shown in FIGS. 2a-2b and FIG. 3, the refresh frequency of the touch control display panel is 60 Hz, the report rate is 120 Hz, the gate lines include 1080 gate lines, the touch control lines include 25 touch control lines. If |2*X1−Y|>10 is satisfied, the interval between a gate line being scanned and a touch control line being scanned is at least an interval of 5 touch control lines. For each X1, Y (which is an integer) is taken 25 times in a range of 1 to 25 in sequence, respectively, so as to obtain X1=7, X2=19, and X1=8, X2=20, as shown in FIGS. 5 and 6.

The control unit 2 shown in FIG. 1 may also include a memory for storing the program instructions as described above. For a specific configuration of the touch control display panel, the program instructions may be executed by the processor to calculate touch control synchronization signals for a plurality of touch control lines before the touch control display panel operates, and these touch control synchronization signals will cooperate with the counter 21 to perform a driving control on the touch control display panel, so that a gate line and a touch control line thereon arranged correspondingly to each other in a physical position are not scanned at the same time. That is, the signals applied to the gate line and the touch control line thereon arranged correspondingly to each other are not in a high level state at the same time, so as to avoid the capacitive coupling between the gate line and the touch control line.

As shown in FIG. 3, the scanning frequency for the gate lines of the touch control display panel is 60 Hz, and the report rate of the touch control driving unit 3 is 120 Hz. Because the scanning frequency for the gate lines is different from the report rate, and the report rate is greater than the scanning frequency for the gate lines, if it is started to scan from the first gate line G1 during the frame displaying, and it is started to scan from the touch control line 1 in the touch control process, the gate control signals applied to the gate lines G1 to G43 are in a valid state (the gate control signals are high-level signal VGH) when it is started to scan from the touch control line 1, and the gate control signals are coupled to the touch control line 1 through the capacitor Cgs, so that the signal-to-noise ratio of a touch control scanning signal is reduced, and a false report may be caused in severe cases.

In this embodiment, when the default number of a gate line from which start to scan is 1, the number of a touch control line from which start to scan is 7 in the first scanning, the number of a touch control line from which start to scan is 19 in the second scanning, or the number of the touch control line from which start to scan is 8 in the first scanning, and the number of the touch control line from which start to scan is 20 in the second scanning.

In the present disclosure, as shown in FIG. 5, one touch control synchronization signal may be generated for each touch control line, and the touch control synchronization signal includes a scanning sequence and a scanning time duration for the touch control line.

Figure 4:
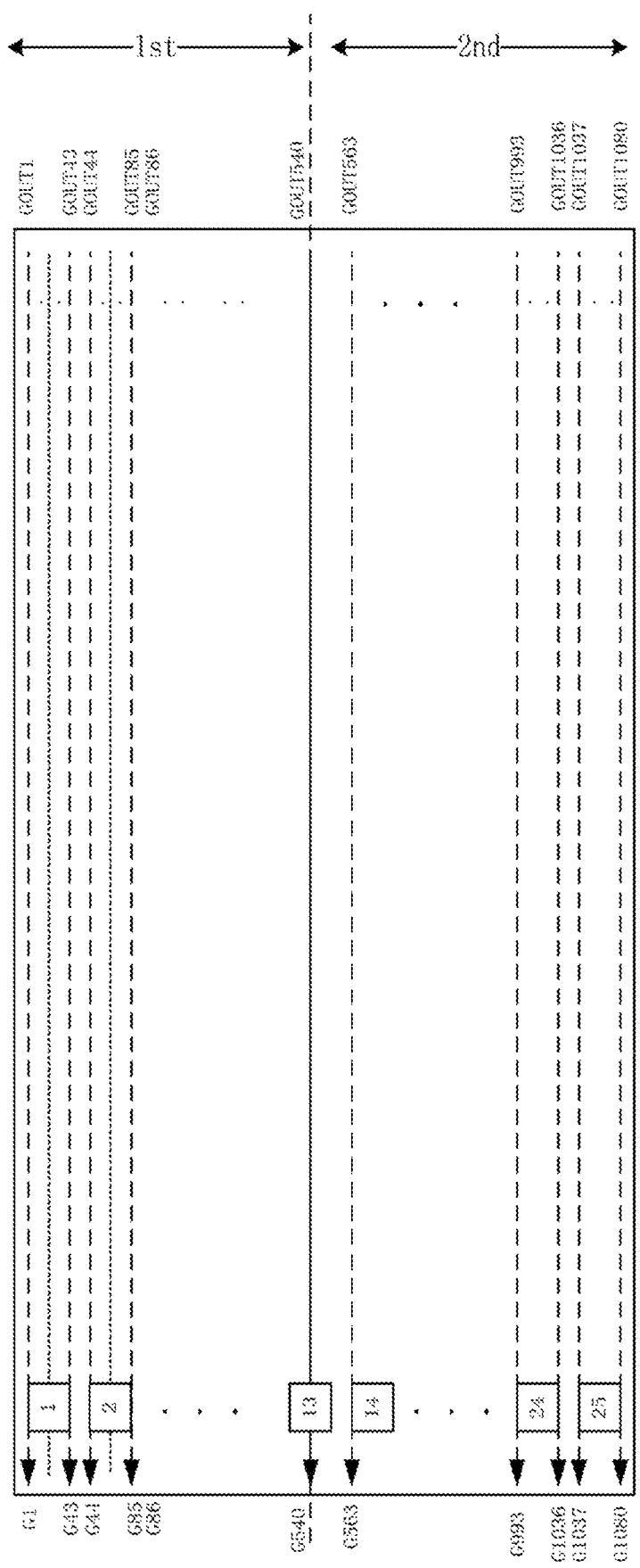
FIG. 4 is a diagram illustrating an operation mode of a driving circuit of a touch control display panel according to an embodiment of the present disclosure.

FIG. 4 is a diagram illustrating an operation mode of a driving circuit of a touch control display panel according to an embodiment of the present disclosure; FIG. 5 is a waveform diagram of signals for driving a display panel according to an embodiment of the present disclosure; and FIG. 6 is a diagram illustrating scanning sequence for gate lines and touch control lines of a driving circuit of a touch control display panel according to an embodiment of the present disclosure.

As shown in FIG. 4, the scanning frequency for the gate lines of the touch control display panel is 60 Hz, and the report rate of the touch control driving unit 3 is 120 Hz, so that the touch control lines need to be scanned twice every time the gate lines of the touch control display panel are scanned once during one frame displaying. For example, the touch control display panel scans from the first gate line G1 to the $540^{th}$ gate line G540, and the gate line G540 corresponds to the $13^{th}$ touch control line (touch control line 13) in a spatial position, at this time, the touch control driving unit 3 completes the scanning of 25 touch control lines for the first time ("$1^{st}$" in FIG. 4 represents a range of the gate lines scanned when completing the scanning of 25 touch control lines for the first time, the range of the scanned gate lines includes the first gate line G1 to the $540^{th}$ gate line G540); the touch control display panel scans from the $541^{st}$ gate line G541 to the $1080^{th}$ gate line G1080, at this time, the touch control driving unit 3 completes the scanning of 25 touch control lines for the second time ("$2^{nd}$" in FIG. 4 represents a range of the gate lines scanned when completing the scanning of 25 touch control lines for the second time, the range of the scanned gate lines includes the $541^{st}$ gate line G541 to the $1080^{th}$ gate line G1080).

As shown in FIG. 5 and FIG. 6, the counter 21 starts counting under a trigger from a rising edge of the start vertical signal, the processor 22 generates a first touch control synchronization signal, and the touch control driving unit 3 outputs a touch control scanning signal to the $7^{th}$ touch control line (touch control line 7) according to the first touch control synchronization signal, so as to start a scanning of the $7^{th}$ touch control line. According to a working principle of driving a gate, a clock signal pulse corresponds to a gate control signal applied to a gate line, and the counter 21 will add 1 to the count result at a rising edge of the clock signal. When the count result reaches 23, that is, after a gate control signal GOUT22 is applied to a gate line G22, the processor 22 generates a second touch control synchronization signal to start a scanning of the $8^{th}$ touch control line, and so on. The processor 22 generates one touch control synchronization signal every 22 clock signals to control the process for scanning the touch control lines. It should be noted that it is merely an example that the processor 22 generates one touch control synchronization signal every 22 clock signals. In practical applications, the processor 22 may generate one touch control synchronization signal every different number of the clock signals.

In one frame displaying, the processor 22 outputs 50 touch control synchronization signals to complete the process for scanning 50 touch control lines, and the sequence of scanning the touch control lines is shown in FIG. 6. As shown in FIG. 6, as the gate control signal GOUT1 being applied to the first gate line G1, the touch control driving unit 3 starts to scan the $7^{th}$ touch control line until the $25^{th}$ touch control line is scanned, and then returns to perform a touch control scanning on the first touch control line until the $6^{th}$ touch control line is scanned, thereby completing the process of the first scanning of the touch control lines (i.e., completing the first report). Then, it continues to scan the gate lines from the $541^{st}$ gate line, the touch control driving unit 3 starts to perform the touch control scanning on the $19^{th}$ touch control line until the $25^{th}$ touch control line is scanned, and then returns to perform the touch control scanning on the first touch control line until the $18^{th}$ touch control line is scanned, thereby completing the process of the second scanning of the touch control lines (i.e., completing the second report). At this point, a process of a first frame displaying is completed. When a next frame displaying starts, the counter 21 performs a zero clearing process on the count result and restarts counting, and the touch control driving unit 3 performs the touch control scanning from the $7^{th}$ touch control line again.

In summary, in the embodiment, the touch control driving unit 3 scans the touch control lines according to the touch control synchronization signal, and the gate lines corresponding to the scanned touch control line are all in an off state, so that an influence of the gate control signals applied to the gate lines on a touch control scanning signal is avoided.

The driving circuit of the touch control display panel further includes a gate driving unit 8. The timing controller 1 is also configured to output the gate driving signal to the gate driving unit 8. The gate driving unit 8 is configured to generate a gate control signal according to the gate driving signal and output the gate control signal to a gate line. In this embodiment, the gate driving unit 8 is a Gate IC or a Gate Driver on Array (GOA) circuit.

The driving circuit of the touch control display panel further includes a system unit 9. The control unit 2 is also configured to output a Touch Report to the system unit 9. The system unit 9 is configured to transmit coordinate information in the Touch Report to the timing controller 1 through an Enhanced Device Protocol (EDP), and the timing controller 1 is further configured to decode the coordinate information in the Touch Report and transmit the decoded coordinate information to the touch control display panel.

In the technical solution of the driving circuit of the touch control display panel provided in this embodiment, the timing controller outputs a gate driving signal to the control unit, the control unit generates at least one touch control synchronization signal according to the gate driving signal, and the touch control driving unit scans the touch control lines of the touch control display panel according to the at least one touch control synchronization signal during one frame displaying, so that the gate control signal applied to a gate line correspondingly arranged to any scanned touch control line is in an invalid state during the frame displaying. The embodiment effectively avoids the influence of the gate control signal applied to the gate line on a touch control scanning signal, improves the signal-to-noise ratio of the touch control scanning signal, and thus avoids the Touch Noise issue caused by the gate control signal and improves the touch control property. The embodiment effectively avoids the influence of the gate control signal applied to the gate line on the touch control scanning signal, thereby also avoiding an occurrence of false report.

The embodiment of the invention also provides a touch control display device including a touch control display panel. A driving circuit of the touch control display panel may be the driving circuit of the touch control display panel of the above embodiments, and the description thereof is not repeated here.

In this embodiment, the touch control display panel is an On Cell touch control display panel.

The touch control display device provided by the embodiment effectively avoids the influence of the gate control signal applied to the gate line on a touch control scanning signal, and improves a signal-to-noise ratio of the touch control scanning signal, thereby avoiding the Touch Noise issue caused by the gate control signal, and improving the touch control performance.

Figure 7:
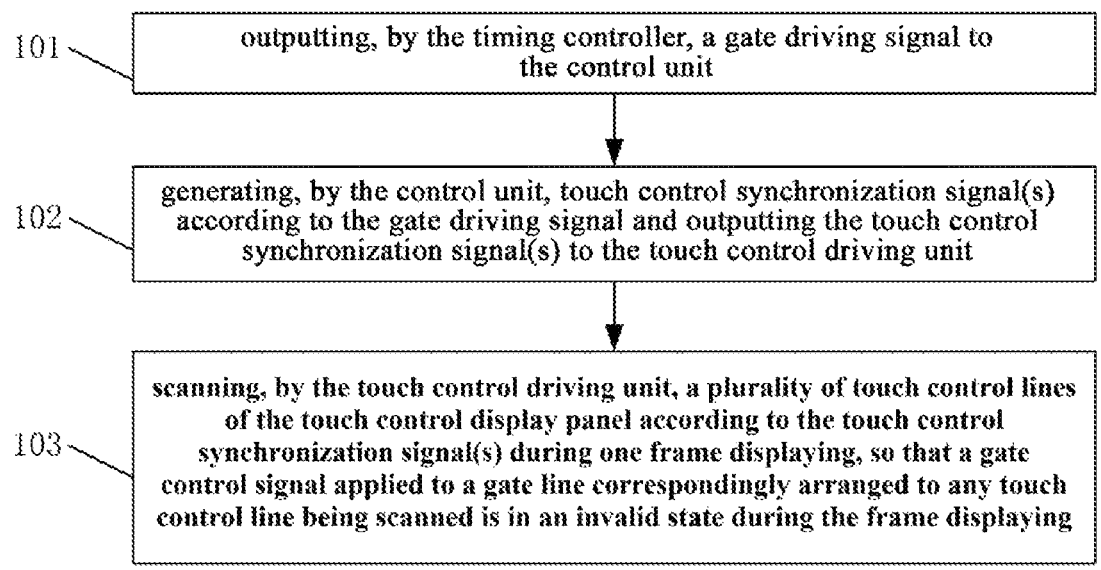
FIG. 7 is a flowchart of a method for driving a touch control display panel according to an embodiment of the present disclosure.

FIG. 7 is a flowchart of a method for driving a touch control display panel according to an embodiment of the present disclosure. As shown in FIG. 7, the method includes following steps 101 to 103.

At step 101, a timing controller outputs a gate driving signal to a control unit.

At step 102, the control unit generates at least one touch control synchronization signal according to the gate driving signal and outputs the at least one touch control synchronization signal to a touch control driving unit.

In this embodiment, the gate scanning signal includes a start vertical signal and a clock signal, and the control unit includes a counter and a processor.

Specifically, step 102 may include following steps 1021 to 1022.

At step 1021, the counter performs a zero clearing process on a count result according to the start vertical signal, counts the count result according to the clock signal and outputs the count result to the processor.

At step 1022, the processor generates the at least one touch control synchronization signal according to the count result and outputs the at least one touch control synchronization signal to the touch control driving unit.

At step 103, the touch control driving unit scans touch control lines of the touch control display panel according to the at least one touch control synchronization signal during one frame displaying, so that a gate control signal applied to a gate line correspondingly arranged to any scanned touch control line is in an invalid state during the frame displaying.

In this embodiment, a report rate of the touch control driving unit is greater than a scanning frequency for gate lines of the touch control display panel; then the step 103 includes: the touch control driving unit scans the touch control lines of the touch control display panel multiple times according to the at least one touch control synchronization signal during one frame displaying.

In this embodiment, the report rate of the touch control driving unit is 2 times of the scanning frequency for the gate lines of the touch control display panel, and the touch control driving unit scans the touch control lines of the touch control display panel twice according to the at least one touch control synchronization signal during one frame displaying.

The method for driving the touch control display panel provided by the embodiment can be used for driving the touch control display panel provided by the above embodiments, and for the specific description of the touch control display panel, reference may be made to the above embodiment, and a description thereof is not repeated here.

The method for driving the touch control display panel provided by the embodiment effectively avoids an influence of the gate control signal applied to the gate line on a touch control scanning signal, and improves a signal-to-noise ratio of the touch control scanning signal, thereby avoiding the Touch Noise issue caused by the gate control signal, and improving the touch control performance.

It will be understood that the above embodiments are merely exemplary embodiments adopted to illustrate the principles of the present disclosure, and the present disclosure is not limited thereto. It will be apparent to one of ordinary skill in the art that various changes and modifications may be made therein without departing from the spirit and essence of the present disclosure, and these changes and modifications are to be considered as falling within the scope of the present disclosure.

What is claimed is:

1. A touch control display panel, comprising a plurality of gate lines arranged on a base substrate, a plurality of touch control lines arranged above the plurality of gate lines and disposed opposite to the plurality of gate lines, and a driving circuit, wherein the plurality of gate lines and the plurality of touch control lines extend in a same direction, and
   the driving circuit comprises: a timing controller, a control unit and a touch control driving unit;
   the timing controller is configured to output a gate driving signal to the control unit;
   the control unit is configured to generate at least one touch control synchronization signal according to the gate driving signal and output the at least one touch control synchronization signal to the touch control driving unit;
   the touch control driving unit is configured to perform a scanning control on the plurality of touch control lines according to the at least one touch control synchronization signal during one frame displaying, so that a gate control signal applied to a gate line correspondingly arranged to any touch control line being scanned is in an invalid state during the frame displaying;
   wherein the driving circuit performs a display control on the plurality of gate lines in a line-by-line scanning manner, and performs a touch control on the plurality of touch control lines in a line-by-line scanning manner, and
   the touch control driving unit performs the scanning control on the plurality of touch control lines to determine, according to the at least one touch control synchronization signal, from which one of the plurality of touch control lines to start to scan the plurality of touch control lines when the driving circuit starts to scan the plurality of gate lines in the line-by-line scanning manner, so that any touch control line and a gate line correspondingly arranged to the touch control line are not in a scanned state at the same time.

2. The touch control display panel according to claim 1, wherein the at least one touch control synchronization signal comprises a plurality of touch control synchronization signals respectively provided for the plurality of touch control lines, wherein the plurality of touch control synchronization signals comprises a scanning sequence and a scanning time duration for each touch control line.

3. The touch control display panel according to claim 2, wherein a report rate of the touch control driving unit is greater than a scanning frequency for the gate lines of the touch control display panel; and the touch control driving unit is configured to scan the plurality of touch control lines of the touch control display panel multiple times according to the at least one touch control synchronization signal during one frame displaying.

4. The touch control display panel of claim 3, wherein the report rate of the touch control driving unit is 2 times of the scanning frequency for the gate lines of the touch control display panel; and the touch control driving unit is configured to scan the plurality of touch control lines of the touch control display panel twice according to the at least one touch control synchronization signal during one frame displaying, and the two scanning comprises a first scanning and a second scanning.

5. The touch control display panel of claim 4, wherein the number of the plurality of gate lines is V, a refresh frequency of the touch control display panel is F, the report rate of the touch control driving unit is M, and the number of the plurality of touch control lines is B, and the number of the scanned gate lines corresponding to the scanning time duration for each touch control line is: $(F/M)*(V/B)$, wherein the number of the scanned gate lines corresponding to a physical position of each touch control line is VB;

the plurality of gate lines are started to be scanned from a first gate line in the line-by-line scanning manner, an initial position for scanning the touch control lines in the first scanning is set to be X1, an initial position for scanning the touch control lines in the second scanning is set to be X2, the number of scanned touch control lines is Y, the maximum value of the number Y of the scanned touch control lines during one frame displaying is $B*M/F$, and an interval between a gate line being scanned and a touch control line being scanned is at least an interval of 5 touch control lines during one frame displaying, the control unit comprises a processor configured to sequentially execute the following equations (1) to (4) to obtain X1 and X2:

$$\begin{cases} 1 \le Y \le B \\ X1 + Y - 1 \le B \\ |VX1/B - F/M*V/B*Y| > 5*V/B \\ Y = Y + 1 \\ X1 = X1 + Y \end{cases} \quad (1)$$

$$\begin{cases} 1 \le Y \le B \\ X1 + Y - 1 > B \\ |VX1/B - F/M*V/B*Y| > 5*V/B \\ Y = Y + 1 \\ X1 = X1 + Y - B \end{cases} \quad (2)$$

$$\begin{cases} B < Y < BM/F \\ X2 + Y - B - 1 \le B \\ |VX2/B - F/M*V/B*Y| > 5*V/B \\ Y = Y + 1 \\ X2 = X2 + Y - B \end{cases} \quad (3)$$

$$\begin{cases} B < Y < BM/F \\ X2 + Y - B - 1 > B \\ |VX2/B - F/M*V/B > 5*V/B \\ Y = Y + 1 \\ X2 = X2 + Y - BM/F \end{cases} \quad (4)$$

wherein ranges of X1 and X2 are obtained by substituting X1 and X2 with all values from 1 to B.

6. The touch control display panel of claim 5, wherein the refresh frequency of the touch control display panel is 60 Hz, the report rate is 120 Hz, the plurality of gate lines comprise 1080 gate lines, the plurality of touch control lines comprise 25 touch control lines, and $|2*X1-Y|>10$, for each X1, Y is taken 25 times in a range of 1 to 25 in sequence, respectively, so as to obtain X1=7, X2=19, and X1=8, X2=20, wherein Y is an integer.

7. The touch control display panel according to claim 6, wherein the gate driving signal comprises a start vertical signal and a clock signal, the control unit further comprises a counter;

the counter is configured to perform a zero clearing process on a count result according to the start vertical signal, count the count result according to the clock signal and output the count result to the processor; and the processor is further configured to generate the at least one touch control synchronization signal according to the count result and the initial position X1 for scanning the touch control lines in the first scanning and the initial position X2 for scanning the touch control lines in the second scanning, and output the at least one touch control synchronization signal to the touch control driving unit.

8. The touch control display panel of claim 7, further comprising a gate driving unit, wherein, the timing controller is configured to output a gate driving signal to the gate driving unit, and the gate driving unit is configured to generate a gate control signal according to the gate driving signal, and output the gate control signal to the plurality of gate lines.

9. The touch control display panel according to claim 1, wherein the at least one touch control synchronization signal comprises a plurality of touch control synchronization signals respectively provided for the plurality of touch control lines, wherein the plurality of touch control synchronization signals comprises a scanning sequence and a scanning time duration for each touch control line.

10. The touch control display panel according to claim 9, wherein a report rate of the touch control driving unit is greater than a scanning frequency for the gate lines of the touch control display panel; and the touch control driving unit is configured to scan the plurality of touch control lines of the touch control display panel multiple times according to the at least one touch control synchronization signal during one frame displaying.

11. A touch control display device, comprising the touch control display panel according to claim 1.

12. A method for driving a touch control display panel, wherein the touch control display panel comprises a plurality of gate lines arranged on a base substrate, a plurality of touch control lines arranged above the plurality of gate lines and disposed opposite to the plurality of gate lines, and a driving circuit, wherein the plurality of gate lines and the plurality of touch control lines extend in a same direction, and the driving circuit comprises: a timing controller, a control unit and a touch control driving unit, the method comprises steps of:

outputting, by the timing controller, a gate driving signal to the control unit;

generating, by the control unit, at least one touch control synchronization signal according to the gate driving signal and outputting the at least one touch control synchronization signal to the touch control driving unit; and performing, by the touch control driving unit, a scanning control on the plurality of touch control lines of the touch control display panel according to the at least one touch control synchronization signal during one frame displaying, so that a gate control signal applied to a gate line correspondingly arranged to any touch control line being scanned is in an invalid state during the frame displaying;

wherein the driving circuit performs a display control on the plurality of gate lines in a line-by-line scanning manner, and performs a touch control on the plurality of touch control lines in a line-by-line scanning manner, and the touch control driving unit performs the scanning control on the plurality of touch control lines to determine, according to the at least one touch control synchronization signal, from which one of the plurality of touch control lines to start to scan the plurality of touch control lines when the driving circuit starts to scan the plurality of gate lines in the line-by-line scanning manner, so that any touch control line and a gate line correspondingly arranged to the touch control line are not in a scanned state at the same time.

13. The method for driving a touch control display panel according to claim 12, wherein the at least one touch control synchronization signal comprises a plurality of touch control synchronization signals respectively provided for the plurality of touch control lines, wherein the plurality of touch control synchronization signals comprises a scanning sequence and a scanning time duration for each touch control line.

14. The method for driving a touch control display panel according to claim 13, wherein a report rate of the touch control driving unit is greater than a scanning frequency for the gate lines of the touch control display panel; and the step of performing, by the touch control driving unit, a scanning control on the plurality of touch control lines of the touch control display panel according to the at least one touch control synchronization signal during one frame displaying comprises steps of:

scanning, by the touch control driving unit, the plurality of touch control lines of the touch control display panel multiple times according to the at least one touch control synchronization signal during one frame displaying.

15. The method for driving a touch control display panel according to claim 14, wherein the report rate of the touch control driving unit is 2 times of the scanning frequency for the gate lines of the touch control display panel; and the step of performing, by the touch control driving unit, a scanning control on the plurality of touch control lines of the touch control display panel according to the at least one touch control synchronization signal during one frame displaying comprises steps of:

scanning, by the touch control driving unit, the plurality of touch control lines of the touch control display panel twice according to the at least one touch control synchronization signal during one frame displaying, and the two scanning comprises a first scanning and a second scanning.

16. The method for driving a touch control display panel according to claim 15, wherein the number of the plurality of gate lines is V, a refresh frequency of the touch control display panel is F, the report rate of the touch control driving unit is M, and the number of the plurality of touch control lines is B, and the number of the scanned gate lines corresponding to the scanning time duration for each touch control line is: (F/M)*(V/B), wherein the number of the scanned gate lines corresponding to a physical position of each touch control line is VB;

the plurality of gate lines are started to be scanned from a first gate line in the line-by-line scanning manner, an initial position for scanning the touch control lines in the first scanning is set to be X1, an initial position for scanning the touch control lines in the second scanning is set to be X2, the number of scanned touch control lines is Y, the maximum value of the number Y of the scanned touch control lines during one frame displaying is B*M/F, and an interval between a gate line being scanned and a touch control line being scanned is at least an interval of 5 touch control lines during one frame displaying, the control unit comprises a processor configured to sequentially execute the following equations (1) to (4) to obtain X1 and X2:

$$\begin{cases} 1 \le Y \le B \\ X1 + Y - 1 \le B \\ |VX1/B - F/M^*V/B^*Y| > 5^*V/B \\ Y = Y + 1 \\ X1 = X1 + Y \end{cases} \quad (1)$$

$$\begin{cases} 1 \le Y \le B \\ X1 + Y - 1 > B \\ |VX1/B - F/M^*V/B^*Y| > 5^*V/B \\ Y = Y + 1 \\ X1 = X1 + Y - B \end{cases} \quad (2)$$

$$\begin{cases} B < Y < BM/F \\ X2 + Y - B - 1 \le B \\ |VX2/B - F/M^*V/B^*Y| > 5^*V/B \\ Y = Y + 1 \\ X2 = X2 + Y - B \end{cases} \quad (3)$$

$$\begin{cases} B < Y < BM/F \\ X2 + Y - B - 1 > B \\ |VX2/B - F/M^*V/B > 5^*V/B \\ Y = Y + 1 \\ X2 = X2 + Y - BM/F \end{cases} \quad (4)$$

wherein ranges of X1 and X2 are obtained by substituting X1 and X2 with all values from 1 to B.

17. The method for driving a touch control display panel according to claim 16, wherein the refresh frequency of the touch control display panel is 60 Hz, the report rate is 120 Hz, the plurality of gate lines comprise 1080 gate lines, the plurality of touch control lines comprise 25 touch control lines, and

|2*X1−Y|>10, for each X1, Y is taken 25 times in a range of 1 to 25 in sequence, respectively, so as to obtain X1=7, X2=19, and X1=8, X2=20, wherein Y is an integer.

18. The method for driving a touch control display panel according to claim 17, wherein the gate driving signal comprises a start vertical signal and a clock signal, and the control unit further comprises a counter;

the method further comprises steps of:

performing, by the counter, a zero clearing process on a count result according to the start vertical signal, counting the count result according to the clock signal, and outputting the count result to the processor; and generating, by the processor, the at least one touch control synchronization signal according to the count result and the initial position X1 for scanning the touch control lines in the first scanning and the initial position X2 for scanning the touch control lines in the second scanning, and outputting the at least one touch control synchronization signal to the touch control driving unit.

* * * * *